United States Patent [19]

Yotsumoto et al.

[11] 4,279,324

[45] Jul. 21, 1981

[54] OPERATING LEVER ASSEMBLY FOR FARM TRACTORS

[75] Inventors: Toshiyuki Yotsumoto, Kishiwada; Tuginobu Ujita, Sakai; Eisaku Shinohara, Izumi, all of Japan

[73] Assignee: Robert Bosch GmbH, Stuttgart, Fed. Rep. of Germany

[21] Appl. No.: 74,452

[22] Filed: Sep. 11, 1979

[30] Foreign Application Priority Data

Oct. 14, 1978 [JP]  Japan .............................. 53-126362

[51] Int. Cl.³ ............................................ B60K 20/02
[52] U.S. Cl. .................................. 180/336; 74/473 R
[58] Field of Search ............... 180/77 R, 77 AG, 336; 74/504, 479, 469, 473 R

[56] References Cited

U.S. PATENT DOCUMENTS

| | | | |
|---|---|---|---|
| 2,533,872 | 12/1950 | Boock et al. ...................... | 180/77 R |
| 3,550,715 | 12/1970 | Johnson ............................. | 180/77 R |
| 3,955,437 | 5/1976 | Heintz ................................ | 74/473 R |

FOREIGN PATENT DOCUMENTS

| | | | |
|---|---|---|---|
| 574495 | 3/1958 | Italy ..................................... | 180/77 R |
| 586533 | 3/1947 | United Kingdom ..................... | 74/504 |
| 223612 | 11/1968 | U.S.S.R. .............................. | 180/77 R |

Primary Examiner—John A. Pekar
Attorney, Agent, or Firm—Edwin E. Greigg

[57] ABSTRACT

An operating lever assembly for a farm tractor comprising a first block attached to a side wall of a transmission case, a second block disposed close to a driver's seat, turning shafts mounted on the first block and operatively connected to operating rods projecting from the side wall of the transmission case, operating levers mounted on the second block, and coupling means operatively connecting the turning shafts to the operating levers.

5 Claims, 4 Drawing Figures

OPERATING LEVER ASSEMBLY FOR FARM TRACTORS

BACKGROUND OF THE INVENTION

The present invention relates to an operating lever assembly for farm tractors having several kinds of operating levers such as an operating lever for a secondary speed change mechanism for selectively giving a high or low speed to the tractor, an operating lever for a creep speed change mechanism for effecting a superreduction in the speed of the tractor, etc.

With conventional operating lever assemblies for farm tractors, various operating levers and intermediate operating members coupled to the levers are attached individually to a frame such as a transmission case. However, this procedure requires a very large number of assembly steps and involves extreme difficulties especially when installing the parts in a limited space, for example, between the transmission case and a fender.

Moreover the operating levers are inconvenient to manipulate from the driver's seat since the levers, which are individuallly installed, are not in a compact arrangement.

SUMMARY OF THE INVENTION

In view of these problems, the main object of the invention is to provide an arrangement in which several kinds of operating levers or intermediate operating members therefor can be mounted on the tractor frame easily and efficiently.

To filfil this object, the operating lever assembly of this invention for farm tractors comprises a plurality of operating rods projecting from a side wall of a transmission case, a first block attached to the side wall of the transmission case, a plurality of turning shafts mounted on the first block, link means operatively connecting the operating rods to the turning shafts respectively, a second block disposed in the vicinity of a driver's seat, a plurality of operating levers mounted on the second block, and coupling means operatively connecting the turning shafts to the operating levers respectively.

According to the invention, several kinds of operating levers or intermediate operating members are supported on a block as an assembly, such that the levers or the intermediate members can be installed in place at the same time merely by attaching the block to a side wall of the transmission case. Accordingly the levers or the intermediate members can be mounted on the tractor frame by the single step of attaching the block to the transmission side wall. This makes it possible to install the operating levers and intermediate operating members easily and accurately even in a location of limited space. Additionally the operating levers or intermediate operating members which are in the form of an assembly can be arranged compactly in one place. This affords another advantage that the driver in his seat can operate the levers with great ease.

Other objects and benefits of the invention will become apparent from the following description.

DESCRIPTION OF THE PREFERRED EMBODIMENTS

Figure 1:
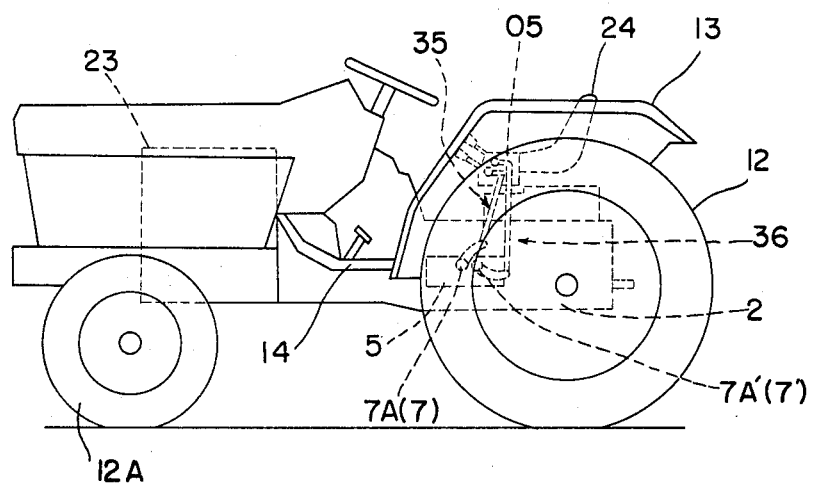
FIG. 1 is an overall side elevation showing a farm tractor equipped with an operating lever assembly embodying the invention.
Figure 2:
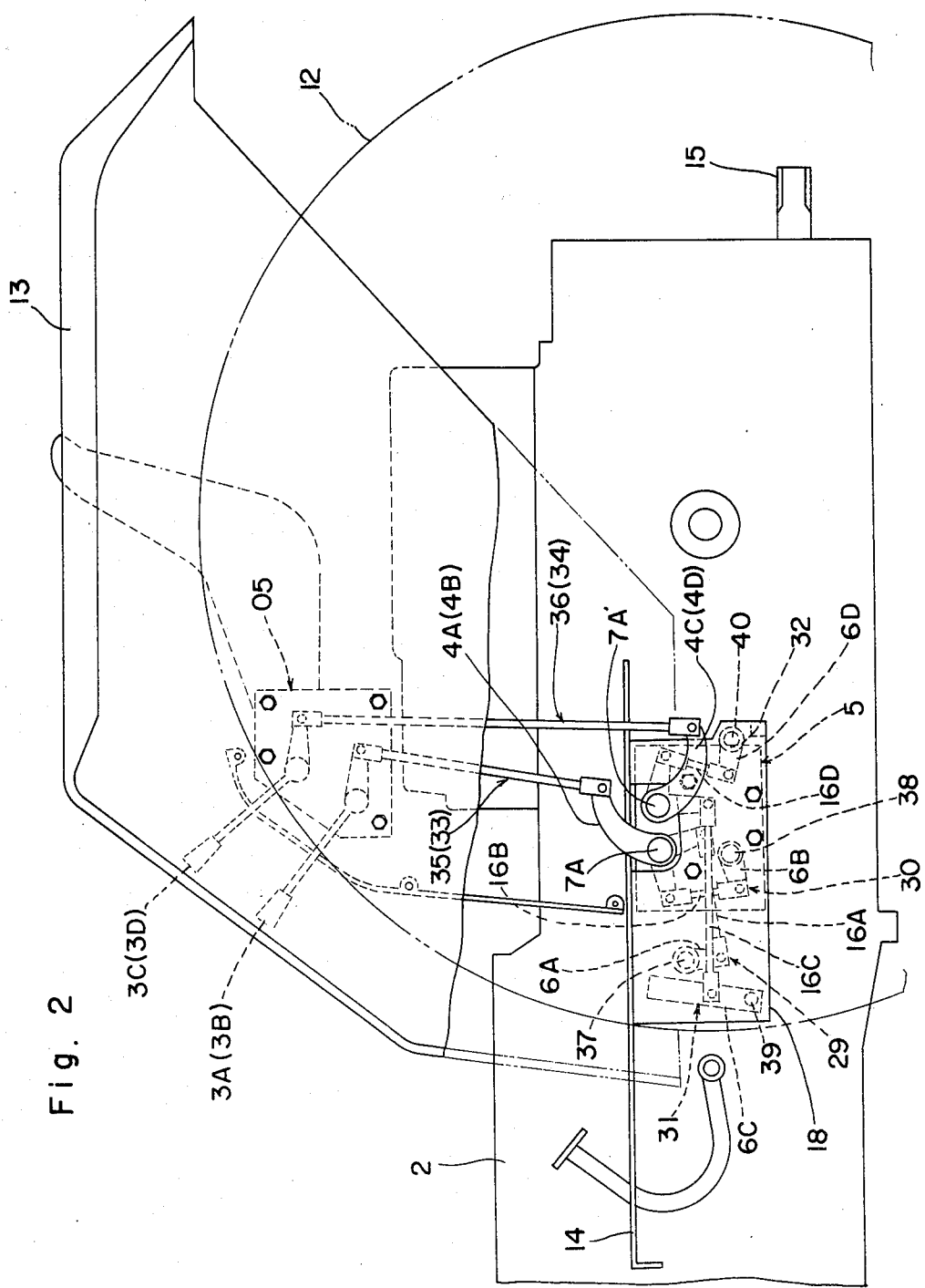
FIG. 2 is a fragmentary side elevation on an enlarged scale showing the assembly.
Figure 3:
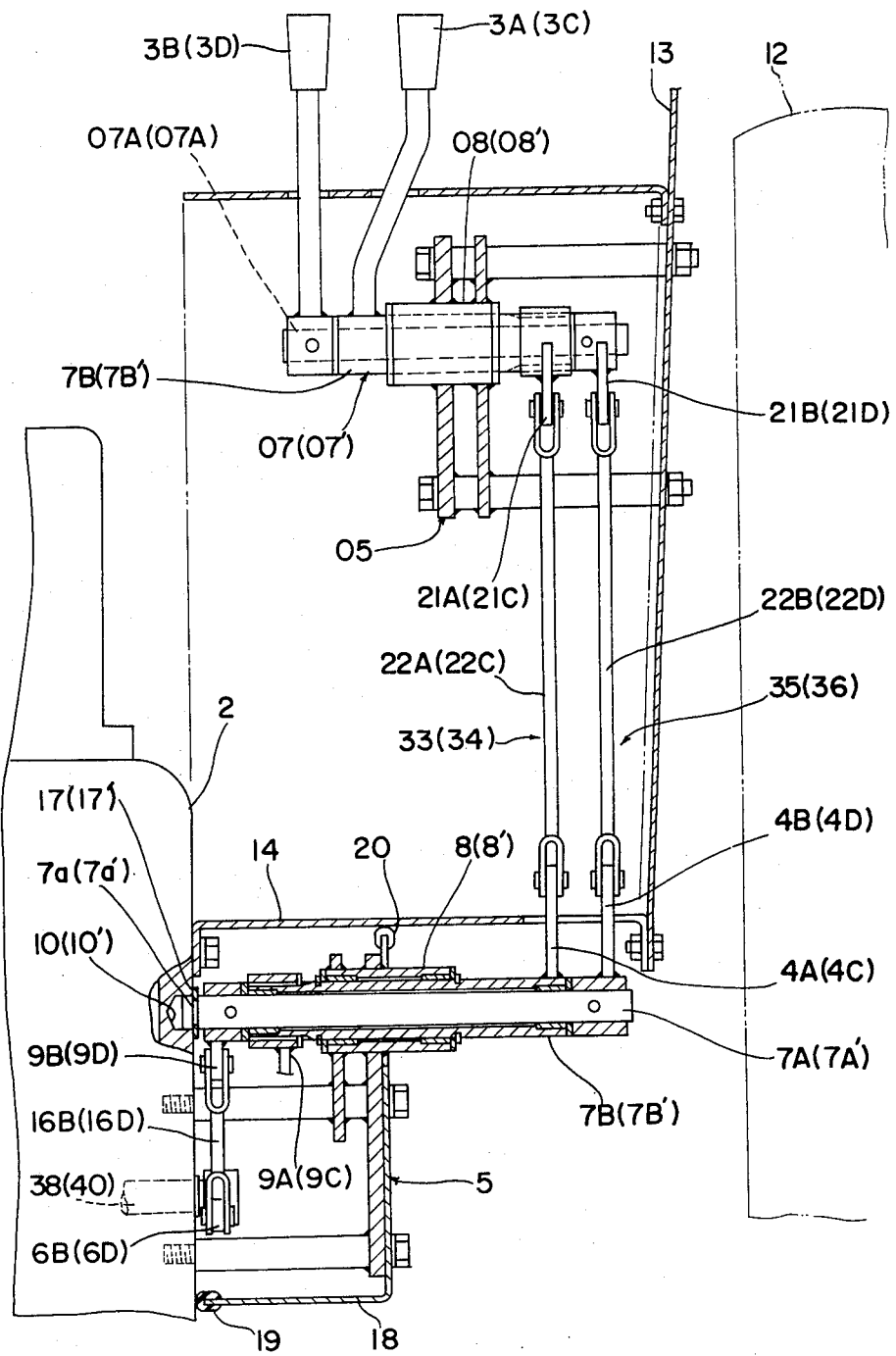
FIG. 3 is a fragmentary enlarged front view in vertical section showing the same.
Figure 3:
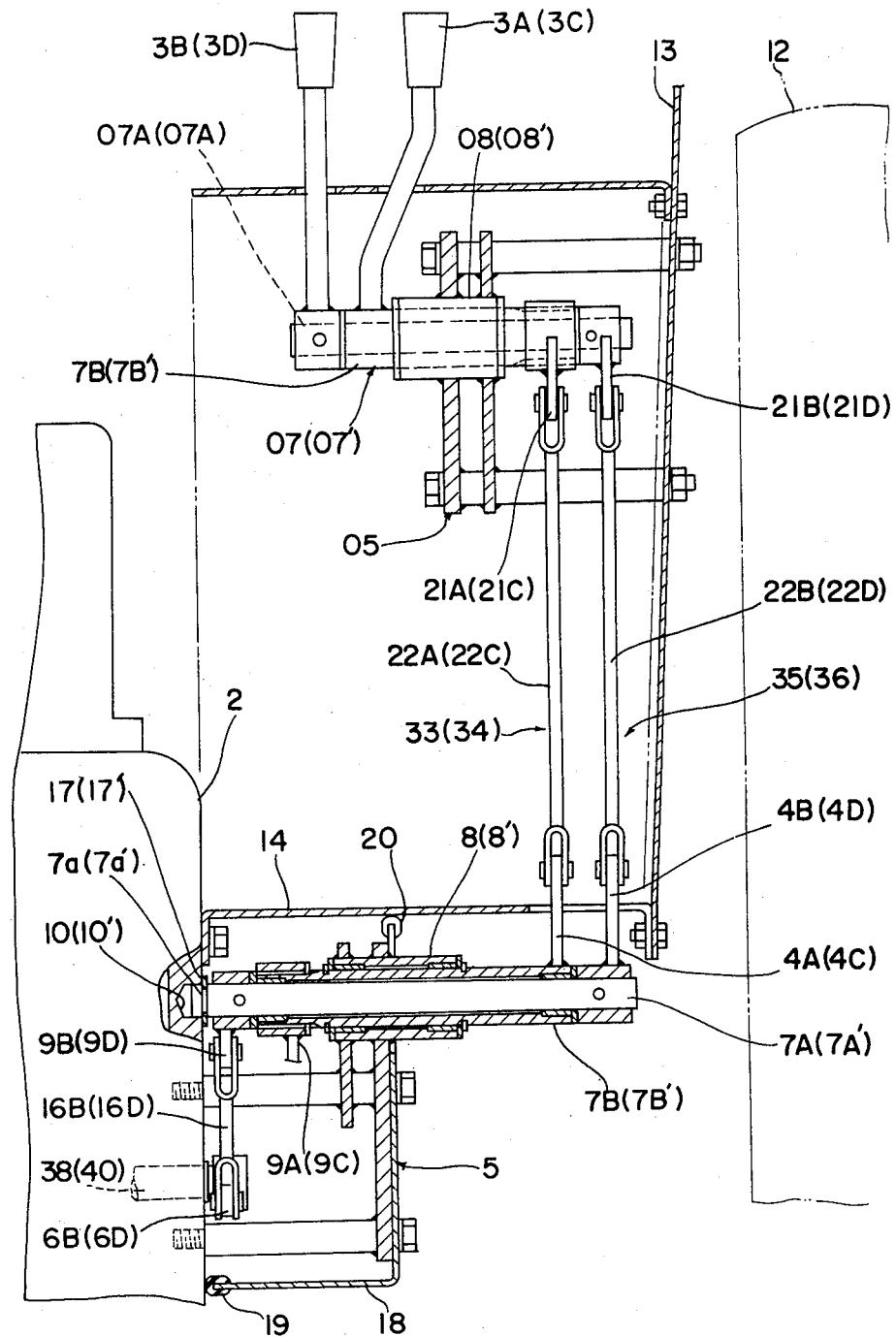

FIG. 1 shows a farm tractor equipped with an operating lever assembly, and FIGS. 2 and 3 show the lever assembly. The operating lever assembly includes an operating lever 3A for a secondary speed change mechanism (not shown) for selectively giving a high or low speed to the tractor, an operating lever 3B for a creep speed change mechanism (not shown) for effecting a superreduction in the speed of the tractor, an operating lever 3C for a drive changeover mechanism (not shown) for running the tractor by four wheels 12A, 12A, 12, 12 or by the rear two wheels 12, 12 selectively, and an operating lever 3D for a PTO change-over mechanism (not shown) for driving a PTO shaft 15 in synchronism with the speed of the tractor or independently thereof selectively, the PTO shaft 15 being adapted to drive a rotary tiller unit or the like. The lever assembly further has intermediate operating members 4A, 4B, 4C, 4D coupled to the operating levers 3A, 3B, 3C, 3D respectively. Operating rods 37, 38, 39, 40 provided for the above mechanisms project outward from a side wall 2 of a transmission case 1 have connecting pieces 6A, 6B, 6C, 6D which are operatively connected to the intermediate operating members 4A, 4B, 4C, 4D respectively in corresponding relation. The secondary speed change mechanism, the creep speed change mechanism, the drive change-over mechanism and the PTO change-over mechanism are of usual construction for use in tractors and therefore will not be described in detail.

The intermediate operating members 4A, 4B, 4C, 4D are turnably supported by a block 5, while the operating levers 3A, 3B, 3C, 3D are also turnably supported by another block 05. The former block (hereinafter referred to as a "first block") 5 is attached to the side wall 2 of the transmission 1 and positioned under a step 14. The latter block (hereinafter referred to as a "second block") 05 is disposed in the vicinity of a driver's seat 24 and attached to a fender 13 provided inside the rear wheel 12 on one side of the tractor.

The intermediate operating members 4A, 4B, 4C, 4D are turnably supported on the first block 5 by two turning double shafts, one composed of inner and outer shafts 7A, 7B, and the other composed of inner and outer shafts 7A', 7B', the double shafts extending through, and being supported by, tubular members 8, 8' fixedly mounted on the first block 5. The operating member 4B for the creep speed change mechanism is fixedly fitted at its base end around one end of the inner turning shaft 7A of one of the double shafts. The base end of the operating member 4A for the secondary speed change mechanism is fixedly fitted around one end of the outer turning shaft 7B around the shaft 7A. The base end of the operating member 4D for the PTO change-over mechanism is fixedly fitted around one end of the inner turning shaft 7A' of the other double shaft. The base end of the operating member 4C for the drive change-over mechanism is fixedly fitted around one end of the outer turning shaft 7B' on the shaft 7A'.

The intermediate operating members 4A, 4B, 4C, 4D are operatively coupled to the connecting pieces 6A, 6B, 6C, 6D by link means 29, 30, 31, 32 respectively.

These link means comprise connecting arms 9A, 9B, 9C, 9D secured to the other ends of the inner and outer turning shafts 7A, 7B, 7A', 7B' and connected to the connecting pieces 6A, 6B, 6C, 6D in corresponding relation by rods 16A, 16B, 16C, 16D. The arms 9A, 9C are secured at their base ends to the other ends of the outer turning shafts 7B, 7B' by being splined to the shafts 7B, 7B' while being held against slipping off. The inner turning shafts 7A, 7A' are fittingly retained at the other ends thereof in bores 10, 10' formed in the side wall 2 of the transmission case 1. Restraining members 17, 17' are engaged in peripheral grooves 7a, 7a' formed in the other ends of the inner turning shafts 7A, 7A' fitted to the transmission case side wall 2 to position the shafts 7A, 7A' in place against axial displacement. A cover 18 surrounds the first block 5 along with the side wall 2 and the step 14. The cover 18 is provided with rubber pieces 19, 20 where it is in contact with the side wall 2 and the step 14.

The operating levers 3A, 3B, 3C, 3D are turnably supported on the second block 05 by two turning double shafts 07, 07'. The double shaft 07 is composed of inner and outer shafts 07A, 07B, and the double shaft 07' comprises inner and outer shafts 07A', 07B'. The double shafts 07, 07' extend through and are supported by tubular members 08, 08' fixedly mounted on the second block 05. The base end of the operating lever 3B for the creep speed change mechanism is fixedly fitted around one end of the inner turning shaft 07A of the double shaft 07. The base end of the operating lever 3A for the secondary speed change mechanism is fixedly fitted around one end of the outer turning shaft 07B. The base end of the operating lever 3D for the PTO change-over mechanism is fixedly fitted around one end of the inner turning shaft 07A' of the other double shaft 07'. The base end of the operating lever 3C for the drive change-over mechanism is fixedly fitted around one end of the outer turning shaft 07B'.

The operating levers 3A, 3B, 3C, 3D are operatively connected to the turning shafts 7A, 7A', 7B, 7B' by coupling means 33, 34, 35, 36. These coupling means are in the form of link means and comprise connecting arms 21A, 21B, 21C, 21D secured to the other ends of the inner and outer turning shafts 07A, 07B, 07B', 07A' of the double shafts 07, 07' for the operating levers 3A, 3B, 3C, 3D and connected, in corresponding relation, to the intermediate operating members 4A, 4B, 4C, 4D on the turning shafts 7A, 7A', 7B, 7B'. The arms 21A, 21C are secured to the other ends of the outer turning shafts 07B, 07B' in the same manner as above. Indicated at 23 is an engine.

Figure 4:
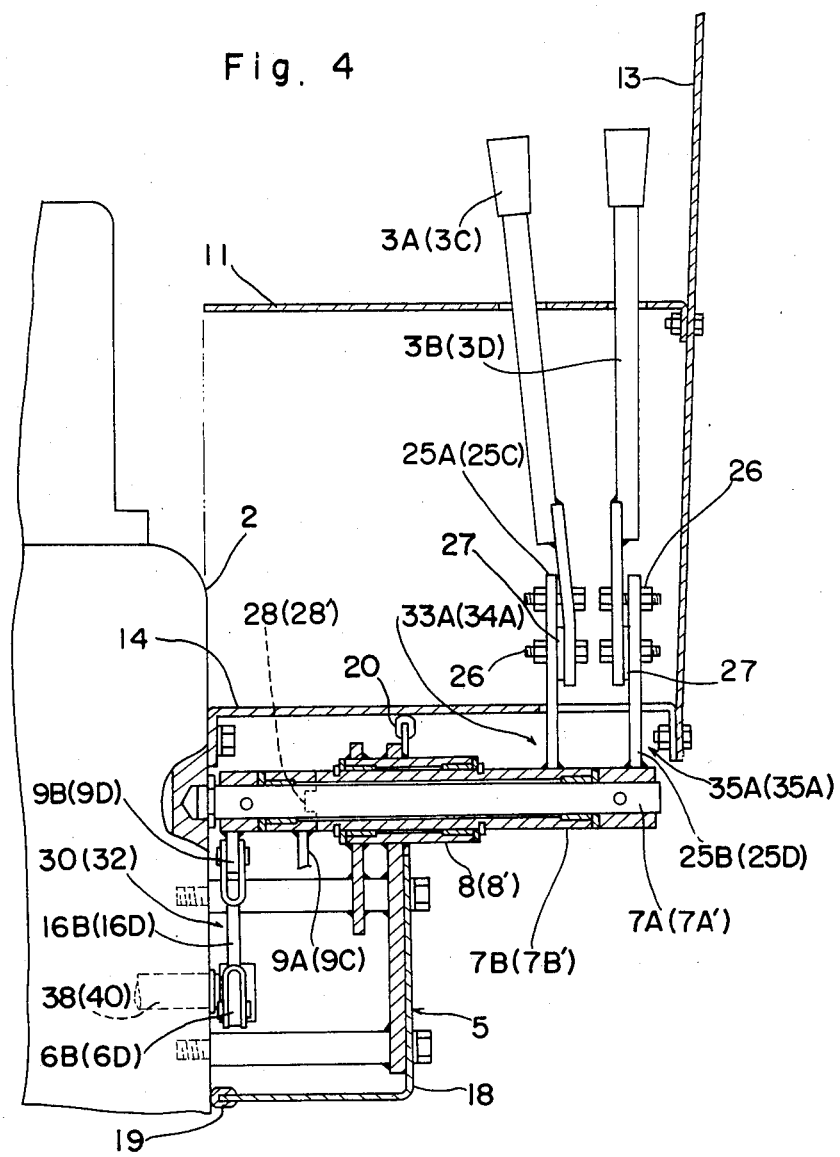
FIG. 4 is an enlarged fragmentary front view in vertical section showing another embodiment.

FIG. 4 shows another embodiment, in which the operating levers 3A, 3B, 3C, 3D are attached directly to the turning shafts 7A, 7A', 7B, 7B' without using the coupling link means 33, 34, 35, 36 of the foregoing embodiment, to cause the first block 5 to support the levers. A guide plate 11 is disposed between the step 14 and the fender 13 for guiding the operating levers 3A, 3B, 3C, 3D. The levers 3A, 3B, 3C, 3D are attached to the turning shafts 7A, 7A', 7B, 7B' by connecting means 33A, 34A, 35A, 36A comprising brackets 25A, 25B, 25C, 25D on the shafts 7A, 7A', 7B, 7B' which brackets are fastened to the base ends of the levers 3A, 3B, 3C, 3D with bolts 26, . . . Thin iron plates 27 interposed between the lever base ends and these brackets 25A, 25B, 25C, 25D render the position of the levers 3A, 3B, 3C, 3D adjustable relative to the guide plate 11.

To fixedly connect the arms 94, 9C to the other ends of the outer turning shafts 7B, 7B', the base ends of the arms 9A, 9C are rotatably fitted around the inner turning shafts 7A, 7A' while being axially restrained by the ends of the shafts 7B, 7B' and by the base ends of the arms 9B, 9D secured to the inner turning shafts 7A, 7A', with engaging portions 28, 28' provided between the base ends of the arms 9A, 9C and the ends of the shafts 7B, 7B' opposed thereto. Although this embodiment is provided with link means corresponding to the link means 29, 30, 31, 32 of the foregoing embodiment and similar thereto, these link means will not be described.

We claim:

1. An operating lever assembly for a farm tractor including a driver's seat and a transmission casing, comprising:
    at least two operating rods extended through and outwardly of a side wall of said transmission case,
    a bracket means disposed outside of and attached to said side wall of said transmission,
    at least one set of double-shaft means composed of inner and outer turning shafts, respectively, and rotatable relative to each other, said double-shaft means being supported for rotation by said bracket means, and said inner turning shaft having an inner end portion fittingly inserted into a bore formed in said side wall of said transmission and thus turnably supported by said side wall,
    at least two sets of link means for operatively connecting said operating rods to said inner and outer turning shafts, respectively, and
    a control lever means having at least two operating levers disposed adjacent to said driver's seat, said operating levers being operatively connected to said inner and outer turning shafts, respectively.

2. An assembly as defined in claim 1, wherein said operating levers are secured to said inner and outer turning shafts so as to be able to directly rotate said turning shafts, respectively.

3. An assembly as defined in claim 1, wherein said operating levers are operatively connected to said inner and outer turning shafts via further link means, respectively.

4. An assembly as defined in clam 2 or 3, wherein there are provided four of said operating rods extending from said transmission through said side wall, two sets of said double-shaft means, four sets of said link means, and four of said operating levers whereby the first operating lever is provided for an auxiliary speed change mechanism for selectively giving a high or low speed to the tractor, the second operating lever is provided for a creep speed change mechanism for effecting a superreduction in the speed of the tractor, the third operating lever is provided for a changeover mechanism for running the tractor by a fourwheel drive or by rear two-wheel drive selectively, and the fourth operating lever is provided for another changeover mechanism for driving a power take-off shaft in synchronism with or independently of the speed of the tractor selectively.

5. An assembly as defined in claim 1, 2 or 3 comprising a guide plate disposed between a step and a fender inside a running wheel for guiding the operating levers.

* * * * *

UNITED STATES PATENT AND TRADEMARK OFFICE
CERTIFICATE OF CORRECTION

PATENT NO.   :   4,279,324
DATED        :   July 21, 1981
INVENTOR(S)  :   Toshiyuki Yotsumoto et al It is certified that error appears in the above—identified patent and that said Letters Patent is hereby corrected as shown below:

[73] Assignee: please insert -- KUBOTA, LTD, Osaka, Japan -- for the assignee, instead of, "Robert Bosch GmbH, Stuttgart, Fed. Rep. of Germany"

Signed and Sealed this

First Day of December 1981

[SEAL]

Attest:

GERALD J. MOSSINGHOFF

Attesting Officer / Commissioner of Patents and Trademarks